Jan. 22, 1952   M. R. J. WYLLIE ET AL   2,583,284
METHOD FOR DETERMINING A PARAMETER OF EARTH
FORMATIONS PENETRATED BY A BOREHOLE
Filed April 20, 1950
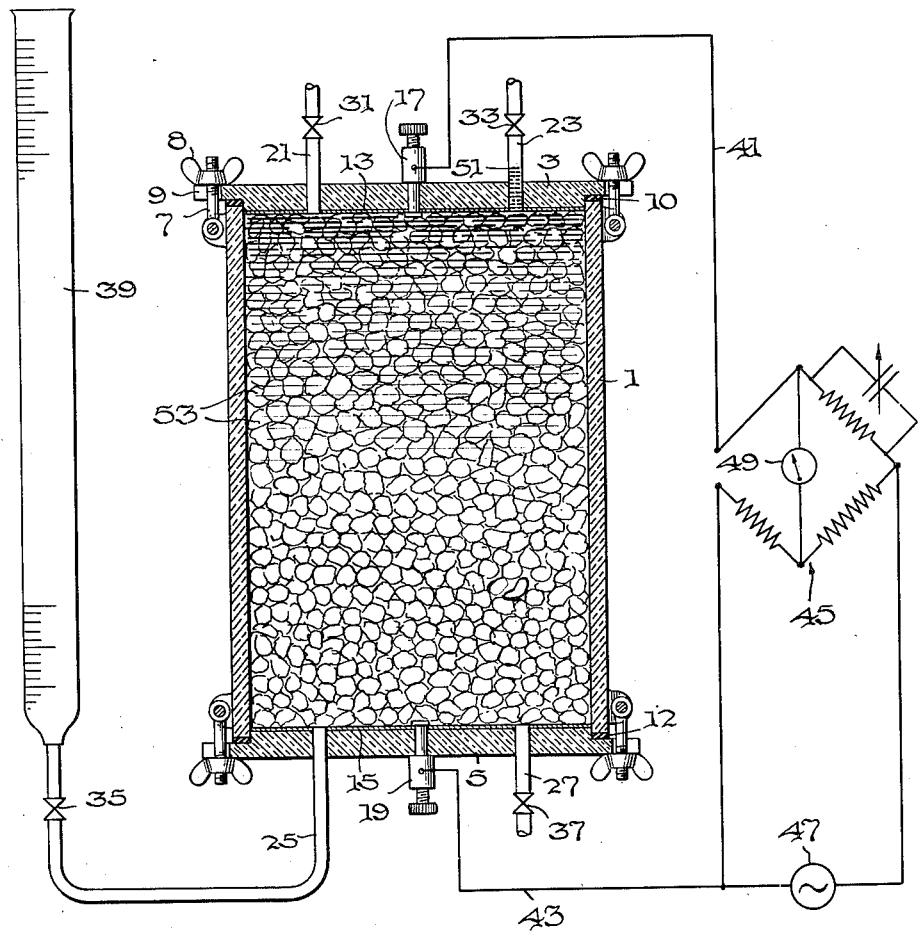
INVENTORS
MALCOLM R. J. WYLLIE
GORDON A. HOGG
BY
ATTORNEY Patented Jan. 22, 1952

2,583,284

UNITED STATES PATENT OFFICE 2,583,284

METHOD FOR DETERMINING A PARAMETER OF EARTH FORMATIONS PENETRATED BY A BOREHOLE

Malcolm R. J. Wyllie, Indiana Township, Allegheny County, Pa., and Gordon A. Hogg, Kuwait, assignors to Gulf Research & Development Company, Pittsburgh, Pa., a corporation of Delaware Application April 20, 1950, Serial No. 157,154

11 Claims. (Cl. 175—183)

This invention has to do with improvements in the electric well-logging art and in particular concerns a method and apparatus for determining at the surface of the ground a factor or parameter of the earth formations penetrated by a borehole during the process of drilling.

Electrical-resistivity well logs are well known. Common practice is to drill the well for a distance, and before setting casing in an interval, making one or more electrical logs of the formations penetrated in this interval. In the subsequent interpretation of these electric logs, various assumptions are customarily made because of the lack of complete theoretical adequacy of the usual logging measurements. Certain factors have been found very useful in the interpretation of the well logs, e. g., mud resistivity, self-potential values, etc.

One factor which has been found useful in interpreting electric logs is commonly called the "formation factor." Reference to this parameter is made in a publication by G. E. Archie entitled "The electrical resistivity log as an aid in determining some reservoir characteristics," Trans. A. I. M. E. (1942), vol. 146, pages 54–62. The formation factor is defined as the resistivity of a 100% fluid-saturated rock divided by the resistivity of the saturating fluid. It is implicit in this definition that the porous rock matrix is itself an insulator or substantially so as compared to the conductance of the fluid saturating the interstices of the rock matrix. The formation factor has heretofore been determined by measuring the resistance of a porous medium of known geometry, generally a right cylinder, computing the resistivity from the length and area of the cylinder and dividing this resistivity by the resistivity of the fluid used to saturate the porous medium. The saturating fluid is usually a brine such as is normally found in the rock, but any electrically-conductive liquid which wets and entirely fills the porous matrix may be used.

The value of the formation-factor measurement lies in the fact that the product of the formation factor of a rock body and the resistivity of the fluid which saturates that body gives the resistivity of the rock body as it exists in the ground. Hence a comparison between such a computed rock-body, i. e. formation, resistivity with the value of the resistivity of the same formation in situ read from a conventional electrical-resistivity log, will indicate the formation to be either water bearing if the two values are sensibly the same, or oil bearing if the computed resistivity is much less than the resistivity read from the log.

Our invention provides a method and apparatus for measuring the formation factor of the rock formations penetrated by a borehole. According to the principle of our invention, the formation factor may be expressed as the resistance of a saturated rock sample divided by the resistance of a volume of fluid having the same shape, size and orientation as the rock sample. In our invention the formation factor is measured as the resistance of a 100% saturated porous medium divided by the resistance of the displaced fluid when the medium is immersed therein, it being understood that the two resistances are measured under the same geometrical conditions of container, electrodes, etc.

Heretofore, in order to obtain measurements of the electrical parameters of the earth formations penetrated by a borehole it has been necessary to core the formation and bring a core to the surface for study. This process is costly both in time and equipment, and is sometimes not practicable at all. If no cores were cut during drilling, the only recourse is to obtain side-wall cores after the hole is completed. Such sidewall cores are small and frequently cannot be cut into the geometrical shapes necessary for making the heretofore-known formation-factor measurements. Frequently also if the formations are too hard or too soft, side-wall cores cannot be recovered at all.

The principle that the formation factor may be measured by the ratio of the resistance of the saturated porous medium to the resistance of the displaced fluid leads to the conclusion that it can be measured without any limitation on the geometry of the porous medium. This independence of geometry means that more than one fragment can be used if a single irregular sample is too small to be handled conveniently. Accordingly, a rock sample comprising a large number of small fragments such as drill cuttings may be used in making a determination of formation factor.

A simple example may serve to point out the advantage of our invention. The formation factor may be determined in heretofore known manner if one has available a core of known geometry. In practice, a core in the form of a right circular cylinder has usually been obtained from the formation to be studied if the formation factor is to be determined by prior-art laboratory methods. It is very expensive to obtain such a core. If the cylinder should be broken into small fragments, the heretofore known methods are of no avail. However, by employing the method and apparatus of our invention, a determination of the formation factor is still possible. In practice, the formation "core" as fragmented by the drill bit during drilling is strained from the drilling mud on the shale shaker screen as a matter of routine since the drill cuttings are always removed from the drilling fluid before the latter may be recirculated. These rock fragments may be used to determine the formation factor of the rock, and the resulting value will be the same value as that which would be measured on the vastly more expensive cylindrical core. It is, of course, assumed that the short section of rock formation being studied is substantially uniform.

A particular advantage of our invention lies in the fact that no core need be taken and no special equipment need be lowered into the borehole to take side-wall cores. In our invention, use is made of the drill cuttings obtained in the course of drilling the borehole, the depth of the source formation of the cuttings being determined by methods well known in the art. The cost of carrying out the method of our invention is therefore very low since it involves no extra operations on the borehole, the drill cuttings being obtained as a natural consequence of drilling the same. Furthermore, since cuttings are always obtained during drilling, our invention may be substantially continuously carried out while the well is being drilled, thus requiring no interruptions in the drilling operation. In addition, it will be seen that the apparatus of our invention is inexpensive and simple, and requires no special skill to operate.

It is an object of this invention to provide a method and apparatus for measuring a parameter of an earth formation penetrated by a borehole.

Another object of this invention is to provide a method and apparatus for measuring a parameter of the earth formations penetrated by a borehole which does not require any special electrical or other equipment to be run into the borehole.

Another object of this invention is to provide a method and apparatus for measuring a parameter of the earth formations penetrated by a borehole which does not require cores to be obtained.

Another object of this invention is to provide a method and apparatus for measuring a parameter of an earth formation penetrated by a borehole by making measurements on cuttings obtained in drilling through the formation.

Another object of this invention is to provide a method and apparatus for measuring a parameter of a porous medium by making measurements on one or more irregularly-shaped samples of the porous medium.

Another object of this invention is to provide a method and apparatus for determining the formation factor of a rock formation by making measurements on one or more irregularly-shaped or fragmented samples of the formation.

These and other objects are attained by our invention as described in the following specification of which the accompanying drawing forms a part.

The drawing shows a schematic diagram of one form of apparatus by means of which our invention may be carried out.

In describing the theory of our invention, reference will be made to electrical conductance, as this permits of an easier understanding thereof than by using resistance. Conductance is the reciprocal of resistance, as is well known.

In our invention, the electrical conductance of a cell which contains the rock-saturating liquid is measured as by means of an electrical-conductivity bridge. A sample of the rock-saturating liquid or formation fluid may be obtained by means of a fluid sampler or its nature may be known from previous wells in the vicinity. Alternatively, mud filtrate from the drilling fluid may be used. The latter is convenient to use since the cuttings are already substantially saturated by or at least partially invaded by mud filtrate. Let the conductance of the measuring cell filled with the liquid be called A.

The same cell is then substantially filled with rock fragments, the voids between the fragments being completely filled with the above-mentioned rock-saturating liquid. The rock fragments are shaken to pack them as tightly as possible and as many as possible are put in the measuring cell. Obviously, the rock matrix nas displaced some of the liquid. The conductance of the rock-and-liquid-filled cell is now measured. Let this conductance be called B.

The rock fragments may then be removed from the cell, dried, and dipped in molten wax, such as paraffin, and excess molten wax allowed to drain off. Upon cooling, the wax forms an impervious, electrically-insulating coating over the pores of each rock fragment since the wax is drawn into the pores by capillary effects. Little, if any, wax adheres to the surface of the fragments and hence their shape is not significantly altered. The coated fragments are then again replaced in the cell and agitated as before to pack them tightly. The voids between fragments are completely filled with the rock-saturating liquid. If there are a large number of fragments present, their arrangement will be statistically substantially the same as it was in making measurement B. The electrical conductance of the cell is again measured. Since the rock fragments are now insulated it is apparent that this measurement now represents only the conductance of the liquid in the voids between the rock fragments. Let this conductance be called C.

Alternatively, the conductance C of the liquid in the voids may be obtained in another manner described as follows. Instead of coating the rock fragments with paraffin to keep out fluid, the last measurement may be made with a liquid which does not penetrate the rock. Thus, if the voids between fragments are filled, for example, with mercury which does not wet and therefore does not penetrate the capillaries of the rock fragments, the measured conductance of the cell is substantially that of the mercury in the voids between fragments. This conductance, multiplied by the ratio of the specific conductivity of the rock-saturating liquid to the specific conductivity of mercury will give the same result as C above. The latter ratio is easily obtained frome measurement A above and a measurement with the cell full of mercury. This method of determining C is somewhat more difficult to carry out because of the high electrical conductivity of mercury, but it has the advantage of requiring no disturbance of the rock fragments after the previously-made measurement B. However, the latter point is unimportant if a large number of irregular rock fragments are used so that a statistical average arrangement of fragments is obtained even though the rock fragments be removed from the cell and replaced after coating with paraffin.

There is still another way in which the conductance C of the liquid in the voids may be determined. Instead of removing the rock fragments and drying and coating with wax, a liquid which will make the fragments hydrophobic may be flowed through the cell containing the rock fragments. An example of such a liquid is a liquid silicone such as Drifilm No. 9987 manufactured by the General Electric Company. This suffices to insulate the fragments by reaction with the water present resulting in the formation of a hydrophobic surface which prevents subsequent entry of aqueous liquid into the pore system. The hydrophobic liquid is then drained off and the voids filled with the same liquid as was used in making measurements A and B. This liquid is thus kept out of the rock fragments and the measurement C may be made as before. This method also has the advantage that the rock fragment need not be disturbed between the making of measurements B and C.

A still further way of obtaining the conductance value C is by computation from the observed void porosity. The volume of the cell may be known or is easily measured in filling the cell with liquid from a burette preparatory to making measurement A. The volume of the voids between the saturated rock fragments may be measured in making the measurement B by observing how much liquid must be introduced into the cell from a burette to fill the voids. The porosity fraction is then the void volume divided by the total volume of the cell. From this fraction, the resistance of the liquid in the void volume may be computed from the known relationship $$R_0 = R\left[\frac{3 - \text{porosity fraction}}{2 \times \text{porosity fraction}}\right]$$

where $R_0$ is the resistance of the liquid occupying the voids and R is the resistance of the cell completely full of liquid. (Cf. "The flow of gas-liquid mixtures through unconsolidated sands" by R. D. Wyckoff and H. G. Botset, Physics, 7, No. 9, 325 (1936).) Then since $C = 1/R_0$ and $A = 1/R$ it is apparent that the conductance C is related to the conductance A by the formula $$C = A\left[\frac{2 \times \text{porosity fraction}}{3 - \text{porosity fraction}}\right]$$

This method also has the advantage that the rock fragments need not be disturbed in making the measurements.

It is evident that the quantity $(B-C)$ is the conductance of the rock samples. Furthermore, the quantity $(A-C)$ is the conductance of an amount of saturating liquid which has the same volume as the rock samples. From this it is seen that the conductance of the saturated rock divided by the conductance of the saturating liquid is simply $(B-C)/(A-C)$. Inasmuch as conductance is the reciprocal of resistance, it is apparent that the resistance of the saturated rock divided by the resistance of the saturating liquid is given by $(A-C)/(B-C)$. Thus, by means of our invention, it is possible to obtain an electrical parameter or formation factor of rock by making measurements on the drill cuttings normally brought to the surface, entirely without special operations either by way of measurements in the borehole or without obtaining special cores or specially-shaped rock samples.

Reference may now be made to the drawing which illustrates one form of apparatus in which the above-described measurements may be made. An electrical-conductivity cell is shown comprising a hollow cylinder 1, preferably transparent, made of either glass, Lucite, or other insulating material. Top and bottom plates 3 and 5, respectively, may be attached to the cylinder by means of clamping bolts 7 whose wing nuts 8 engage bifurcated extension 9 on the end plates. The joint between the end plates and the cylinder may be made liquid-tight by means of thin rubber gaskets 10 and 12. The volume of the cell thus formed may conveniently be about 100 c. c.

The end plates 3 and 5 may be made of Lucite or other insulating material and have molded or inlaid on the interior surfaces platinum electrodes 13 and 15 whose exposed surfaces may be platinized as is customary for conductivity-cell electrodes. Electric terminals 17 and 19, connected to each electrode and passing through the respective end plate, provide electrical connection to the electrodes inside the cell after assembly. Alternatively, the end plates 3 and 5 may be made of metal and may themselves serve as electrodes.

Each of the end plates 3 and 5 may have two openings accommodating tubes 21, 23, 25 and 27, each of the latter being equipped with a stop cock as at 31, 33, 35 and 37. One of the tubes, 23, of the upper plate may be used as an overflow, and the other connection 21 may be connected to vacuum, the latter being used to remove all air from the cell when it is desired to saturate the cell contents with liquid. One of the tubes, 27, of the lower plate may be used as a drain, and the other, 25, may be flexible and be formed to turn upward and connect to a calibrated burette 39. The tube 25 may be made of flexible tubing so that liquid from the burette 39 may be flowed into or out of the cylinder 1 by raising or lowering it by conventional means. The burette 39 is of course of somewhat larger capacity than the volume of cell 1.

The electrodes 13 and 15 of the cell are connected through terminals 17 and 19 and lead wires 41 and 43 to an A.-C. conductivity bridge of well-known type indicated schematically at 45 and which per se does not form part of this invention. The bridge excitation may be obtained from an A.-C. source as shown at 47 and bridge balance may be indicated on galvanometer or other null indicator 49. The resistance of the cell is obtained from the three known resistances as is well known in the art of making resistance measurements.

A procedure which may be followed is described below. The steps and materials used may be varied as previously described and the following is given by way of example and is not to be construed as limiting the scope of our invention. In the example below, the mud filtrate will be used as exemplifying the saturating liquid.

A sample quantity of drill cuttings are collected from the mud screen at the well and the depth whence they came is computed and noted. If the sample cuttings appear contaminated they should be extracted to remove residual oil and salts. If the sample cuttings do not appear to be contaminated, the sample may be simply washed as is customary to remove fines and mud. The rock fragments in the sample may already be saturated with mud filtrate. A quantity of mud filtrate is also obtained and if there is any doubt that the rock fragments be saturated the latter should be steeped in the filtrate for a sufficient time to effect saturation. Alternatively, the apparatus of Figure 1 may be used to effect complete saturation of the rock fragments by the mud filtrate, the fragments being placed in the cell, the cell evacuated and the mud filtrate then allowed to flow into the cell whereupon the mud filtrate will permeate the pores of the rock fragments.

Starting with a clean cell, the saturating filtrate is run in to fill the cell to the overflow mark 51 from the burette or other container. The resistance of the cell is then measured, and the reciprocal of this value is the conductance A. The filtrate may then be drained from the cell. If not already known, it is convenient to measure the volume of the cell by noting the required volume of liquid from the burette.

The cell is then filled with washed rock fragments 53 and shaken so as to pack the fragments down. Enough fragments should be placed in the cell to fill it as completely as possible when the cover 3 is clamped down. The filtrate is then again run into the cell to the overflow mark 51 so as to completely fill all the voids between the fragments and the required volume of filtrate noted from the burette. Inasmuch as the fragments themselves have already been saturated with the filtrate (or may be so saturated by the use of vacuum in the present stage of the process) it is apparent that the only part of the cell now not occupied by the filtrate is the rock matrix itself. The resistance is now measured and its reciprocal is the conductance value B.

In order to obtain the conductance C any one of several procedures may be used as previously described. Let us assume that the volume of the cell is known to be 100 c. c. and that the volume of filtrate required to fill the voids between fragments preparatory to making the measurement B is 45 c. c. (note that this does not include any filtrate which might have been used to effect saturation of the rock fragments themselves). The void porosity of the system is therefore .45. The conductance of the liquid in the voids may then be calculated from the relation.

$$C = A \left[ \frac{2 \times \text{porosity fraction}}{3 - \text{porosity fraction}} \right]$$

In this instance $C = A(2 \times .45)/(3 - .45) = .353A$, and since A has already been measured we now have the value of C. Alternatively, of course, any of the other previously-mentioned methods of obtaining the value C may be used.

Having thus obtained the three conductance values A, B and C, the formation factor may be computed from the simple relation $$(A-C)/(B-C)$$

The formation factor computed from the above-described measurements is thus obtained without going to the trouble and expense of coring the formation.

Having measured the formation factor for the various rock formations penetrated by the drill, the values may be tabulated or plotted as a log against depth. This information may then be used in making computations on various individual formations in order to interpret the logs in a manner required in the petroleum exploration art.

While we have described and illustrated our invention as applied to determining the formation factor of rock formations encountered in drilling a borehole, our invention may be used to determine such a characteristic of any porous medium, samples of which are available.

Furthermore, while we have illustrated our invention as used in measuring samples available in fragmentary form, our invention is equally applicable to larger sample pieces either regular or irregular in shape and upon which the measurements are made singly or in small numbers. However, in the event that the measurements are made on single pieces or on a small number of pieces, the orientation thereof should not be disturbed between the determination of conductances B and C in order that identical conditions of current flow shall exist in these two measurements.

In the appended claims the term electrical conductance is used in order to simplify the terminology and conform to the theory hereinabove disclosed. It is to be understood that a conductance measurement includes in its meaning and is equivalent to a resistance measurement whose reciprocal value is taken.

What we claim as our invention is:

1. A method of determining a characteristic of a porous medium which comprises obtaining fragmentary samples of said medium, saturating said fragments with an electrically-conducting liquid, measuring the electrical resistance of a quantity of said saturated fragments, and measuring the electrical resistance of the said liquid displaced by said quantity of fragments when immersed therein and having the same electrical configuration as in said first measurement, whereby the ratio of the first said resistance to the second said resistance may be computed as a characteristic of the medium.

2. A method of determining a characteristic of a rock formation encountered in drilling a borehole which comprises collecting rock cuttings arising from drilling the formation, saturating said cuttings with an electrically-conducting liquid, measuring the electrical resistance of said saturated cuttings, and measuring the electrical resistance of the said liquid displaced by said cuttings when immersed therein and having the same electrical configuration as in said first measurement, whereby the ratio of the first said resistance to the second said resistance may be computed as a characteristic of the formation drilled.

3. A method of determining a characteristic of a porous medium which comprises obtaining fragmentary samples of said medium, saturating said fragments with an electrically-conducting liquid, measuring the electrical conductance of an electrolytic cell filled with said liquid, measuring the electrical conductance of said cell with said saturated fragments and with said liquid filling the voids therebetween, electrically insulating said fragments and measuring the electrical conductance of said cell filled with said insulated fragments and with said liquid filling the voids therebetween, whereby the ratio of the difference between the second and third said conductance to the difference between the first and third conductance may be computed as a characteristic of the medium.

4. A method of determining a characteristic of a rock formation encountered in drilling a borehole which comprises collecting rock cuttings arising from drilling the formation, saturating said cuttings with an electrically-conducting liquid, measuring the electrical conductance of an electrolytic cell filled with said liquid, measuring the electrical conductance of said cell filled with said saturated cuttings and with said liquid filling the voids therebetween, electrically insulating said cuttings, and measuring the electrical conductance of said cell filled with said insulated cuttings and with said liquid filling the voids therebetween, whereby the ratio of the difference between the second and third said conductance to the difference between the first and third said conductance may be computed as a characteristic of the formation drilled.

5. A method of determining a characteristic of a porous medium which comprises obtaining fragmentary samples of said medium, saturating said fragments with an electrically-conducting liquid, measuring the electrical conductance of an electrolytic cell filled with said liquid, measuring the electrical conductance of said cell filled with said saturated fragments and with said liquid filling the voids therebetween, coating said fragments with wax, and measuring the electrical conductance of said cell filled with said coated fragments and with said liquid filling the voids therebetween, whereby the ratio of the difference between the second and third said conductance to the difference between the first and third said conductance may be computed as a characteristic of the medium.

6. A method of determining a characteristic of a rock formation encountered in drilling a borehole which comprises collecting rock cuttings arising from drilling the formation, saturating said cuttings with an electrically-conducting liquid, measuring the electrical conductance of an electrolytic cell filled with said liquid, measuring the electrical conductance of said cell filled with said saturated cuttings and with said liquid filling the voids therebetween, coating said cuttings with wax, and measuring the electrical conductance of said cell filled with said coated cuttings and with said liquid filling the voids therebetween, whereby the ratio of the difference between the second and third said conductance to the difference between the first and third said conductance may be computed as a characteristic of the formation drilled.

7. A method of determining a characteristic of a porous medium which comprises obtaining fragmentary samples of said medium, saturating said fragments with an electrically-conducting liquid, measuring the electrical conductance of an electrolytic cell filled with said liquid, measuring the electrical conductance of said cell filled with said saturated fragments and with said liquid filling the voids therebetween, coating said fragments with a liquid which makes the surface of said fragments hydrophobic, and measuring the electrical conductance of said cell filled with said coated fragments and with said liquid filling the voids therebetween, whereby the ratio of the difference between the second and third said conductance to the difference between the first and third said conductance may be computed as a characteristic of the medium.

8. A method of determining a characteristic of a rock formation encountered in drilling a borehole which comprises collecting rock cuttings arising from drilling the formation, saturating said cuttings with an electrically-conducting liquid, measuring the electrical conductance of an electrolytic cell filled with said liquid, measuring the electrical conductance of said cell filled with said saturated cuttings and with said liquid filling the voids therebetween, coating said cuttings with a liquid which makes the surface of said cuttings hydrophobic, and measuring the electrical conductance of said cell filled with said coated cuttings and with said liquid filling the voids therebetween, whereby the ratio of the difference between the second and third said conductance to the difference between the first and third said conductance may be computed as a characteristic of the formation drilled.

9. A method of determining a characteristic of a porous medium which comprises obtaining fragmentary samples of said medium, saturating said fragments with an electrically-conducting first liquid, measuring the electrical conductance of an electrolytic cell filled with said first liquid, measuring the electrical conductance of said cell filled with said saturated fragments and with said first liquid filling the voids therebetween, measuring the electrical conductance of said cell filled with said fragments and with the voids therebetween filled with an electrically-conducting second liquid which is non-miscible with said first liquid, measuring the relative conductivities of said first saturating liquid and said second liquid whereby the electrical conductance of said first saturating liquid in the voids between said fragments may be computed, and whereupon the ratio of the difference between the second said conductance and said computed conductance to the difference between the first said conductance and said computed conductance may be computed as a characteristic of the medium.

10. A method of determining a characteristic of a rock formation encountered in drilling a borehole which comprises collecting rock cuttings arising from drilling the formation, saturating said cuttings with an electrically-conducting first liquid, measuring the electrical conductance of an electrolytic cell filled with said first liquid, measuring the electrical conductance of said cell filled with said saturated cuttings and with said first liquid filling the voids therebetween, measuring the electrical conductance of said cell filled with said cuttings and with the voids therebetween filled with an electrically-conducting second liquid which is non-miscible with said first liquid, measuring the relative conductivities of said first saturating liquid and said second liquid whereby the electrical conductance of said first saturating liquid in the voids between said rock cuttings may be computed and whereupon the ratio of the difference between the second said conductance and said computed conductance to the difference between the first said conductance and said computed conductance may be computed as a characteristic of the formation drilled.

11. A method of determining a characteristic of a porous medium which comprises obtaining a sample of said medium, saturating said sample with an electrically-conducting liquid, measuring the electrical resistance of said saturated sample, and measuring the electrical resistance of the said liquid displaced by said sample when immersed therein, and having the same electrical configuration as in said first measurement, whereby the ratio of the first said resistance to the second said resistance may be computed as a characteristic of the medium.

MALCOLM R. J. WYLLIE.
GORDON A. HOGG.

REFERENCES CITED

The following references are of record in the file of this patent:

UNITED STATES PATENTS

| Number | Name | Date |
|---|---|---|
| 1,860,397 | Slawinski | May 31, 1932 |